US011397636B2

(12) United States Patent
Constantin et al.

(10) Patent No.: US 11,397,636 B2
(45) Date of Patent: Jul. 26, 2022

(54) TRIGGERING DIAGNOSTIC DATA GENERATION AND AGGREGATION ACROSS MULTIPLE SYSTEMS TO REDUCE COMPUTING RESOURCES

(71) Applicant: Microsoft Technology Licensing, LLC, Redmond, WA (US)

(72) Inventors: Marius Cristian Constantin, Redmond, WA (US); Angel Monterrubio, Redmond, WA (US); Ricardo Soares Stern, Redmond, WA (US); Olga Ryabchenkova, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/171,597

(22) Filed: Feb. 9, 2021

(65) Prior Publication Data
US 2021/0165707 A1  Jun. 3, 2021

Related U.S. Application Data

(62) Division of application No. 16/548,323, filed on Aug. 22, 2019, now Pat. No. 10,949,282.

(51) Int. Cl.
| *G06F 15/173* | (2006.01) |
| *G06F 11/07* | (2006.01) |
| *G06F 3/06* | (2006.01) |
| *H04L 43/065* | (2022.01) |
| *H04L 67/10* | (2022.01) |

(52) U.S. Cl.
CPC .......... *G06F 11/0787* (2013.01); *G06F 3/067* (2013.01); *G06F 3/0608* (2013.01); *G06F 3/0643* (2013.01); *H04L 43/065* (2013.01); *H04L 67/10* (2013.01)

(58) Field of Classification Search
None
See application file for complete search history.

(56) References Cited

U.S. PATENT DOCUMENTS 9,304,796 B1 * 4/2016 Douglas ................ G06F 11/079
9,495,234 B1 * 11/2016 Hamman ............... G06F 11/079
(Continued)

FOREIGN PATENT DOCUMENTS

GB           2519621 A * 4/2015 .......... G06F 11/3089

*Primary Examiner* — Phyllis A Book
(74) *Attorney, Agent, or Firm* — Christopher J. Volkmann; Kelly, Holt & Christenson, PLLC

(57) ABSTRACT

A server implementing a service receives a request from a client computing system and stores the request in a cache, along with a correlation identifier. The server returns a response to the request, along with a correlation identifier (ID). When a trigger input is received, indicating that a problem has been encountered at the client computing system, a diagnostic data generation system on the service accesses the cache and generates diagnostic data for the request corresponding to the correlation ID. The diagnostic data corresponding the correlation ID is then provided to a support data storage system where it can be combined with diagnostic data from the client computing system, to be accessed by a support computing system. This reduces consumption of computing resources, such as processing time, memory initialization and/or network bandwidth.

15 Claims, 6 Drawing Sheets

(56) References Cited

U.S. PATENT DOCUMENTS

| | | | | |
|---|---|---|---|---|
| 10,481,993 | B1* | 11/2019 | Sharifi Mehr | G06F 11/0775 |
| 10,489,232 | B1* | 11/2019 | BeSerra | G06F 11/0709 |
| 2005/0261879 | A1* | 11/2005 | Shrivastava | G06F 11/366 |
| | | | | 714/E11.026 |
| 2015/0195182 | A1* | 7/2015 | Mathur | G06F 11/3051 |
| | | | | 714/27 |
| 2015/0227405 | A1* | 8/2015 | Jan | G06F 11/0778 |
| | | | | 714/37 |
| 2016/0077910 | A1* | 3/2016 | Dev | G06F 11/0742 |
| | | | | 714/4.3 |
| 2017/0054610 | A1* | 2/2017 | Vangala | G06F 11/079 |
| 2018/0060225 | A1* | 3/2018 | Tao | G06F 11/3692 |
| 2019/0342374 | A1* | 11/2019 | Jones | H04L 67/2833 |

* cited by examiner

TRIGGERING DIAGNOSTIC DATA GENERATION AND AGGREGATION ACROSS MULTIPLE SYSTEMS TO REDUCE COMPUTING RESOURCES

CROSS-REFERENCE TO RELATED APPLICATION

The present application is a divisional of and claims priority of U.S. patent application Ser. No. 16/548,323, filed Aug. 22, 2019, the content of which is hereby incorporated by reference in its entirety.

BACKGROUND

Computer systems are currently in wide use. Some computer systems operate in a client/server architecture. In such an architecture, servers in a remote server environment provide services that can be accessed by client computing systems.

In these types of computing systems, it is not uncommon for the service to perform in a way that is problematic. For instance, there may be bugs or other malfunctions in the server logic that implement the performance of the service. In such scenarios, end users often provide an input indicating that a problem has occurred. For instance, an end user may actuate a link that can be used to report a problem to a support engineer or other support person.

The discussion above is merely provided for general background information and is not intended to be used as an aid in determining the scope of the claimed subject matter.

SUMMARY

A server implementing a service receives a request from a client computing system and stores the request in a cache, along with a correlation identifier. The server returns a response to the request, along with a correlation identifier (ID). When a trigger input is received, indicating that a problem has been encountered at the client computing system, a diagnostic data generation system on the service accesses the cache and generates diagnostic data for the request corresponding to the correlation ID. The diagnostic data corresponding to the correlation ID is then provided to a support data storage system where it can be combined with diagnostic data from the client computing system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
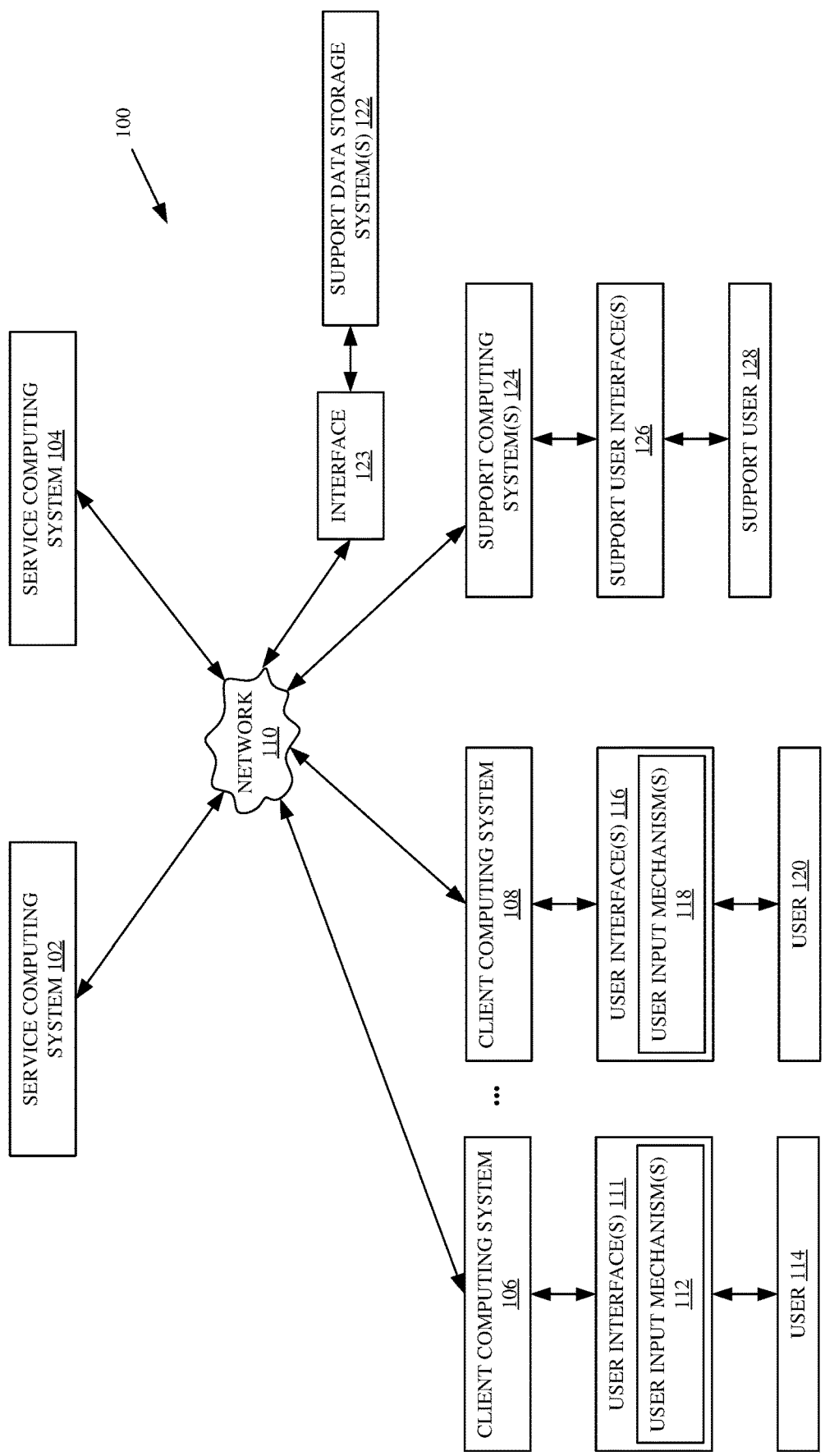
FIG. 1 is a block diagram of one example of a computing system architecture.

As discussed above, in a client/server architecture, it is not uncommon for a client computing system. to experience a problem in using the service. The problem may be caused by bugs in the service, logic malfunction in the service, or for other reasons. This may be detected by an end user or an automated system. In such cases, the end user (or an automated component on the client computing system) may provide an input indicating that the performance of the service is in some way inadequate. For instance, the end user may actuate a link indicating a request to report an issue to a support engineer or other support person.

In order to address the reported issue, the support person often needs to access a variety of different data stores where diagnostic data is stored. For instance, it may be that the server that is implementing the service generates server diagnostic data and stores it in one data store. It may be that the client computing system, however, generates client diagnostic data and stores it in a different data store. Similarly, there may be a plurality of different services that have performed operations in response to the same request. Each of those services may generate server diagnostic data and store it in yet other data stores. Thus, when the support user (e.g., support engineer) wishes to analyze the diagnostic data to address the issue reported by the client, the support user must often access a plurality of different data stores in an attempt to piece together the diagnostic data corresponding to the reported issue. This can be cumbersome, time consuming, and error prone.

To address this problem, some current systems, the server generates diagnostic data every time it responds to a client request. It sends the diagnostic data to the client, embedded in the payload of the client's data that is returned in response to the request. However, the diagnostic data can be of a significant size. Therefore, when the diagnostic data is sent with every request (regardless of whether a problem is encountered) this unnecessarily consumes bandwidth and also uses computing overhead to generate the diagnostic data, when it will never be used. However, in current systems, where the diagnostic data is not generated by the server, then by the time the user reports a problem with the previous request, the server has already lost the ability to generate at least some of the diagnostic data.

The present description thus proceeds with respect to a system in which the server generates a correlation identifier (ID), corresponding to a request received from a client computing system and stores the request and correlation ID in cache. The server then generates a response to the request and returns the response, along with the correlation ID, to the client computing system. If a problem is encountered, the client computing system sends an indication to the server, indicating that a problem was encountered, along with the correlation ID. The server then accesses the cache and identifies the request corresponding to the correlation ID and generates diagnostic data for that request. The diagnostic data is then sent to a support data storage system, where it can be stored along with (or indexed by) the correlation ID. Similarly, the client computing system sends its diagnostic data, along with the correlation ID, to the support data storage system. The client diagnostic data is thus stored along with the server diagnostic data, as well as the correlation ID. Therefore, a support user (such as a support engineer) can access a single data store (e.g., the support data storage system) using the correlation ID and obtain an aggregated view of both the client diagnostic data and the server diagnostic data. This saves computing resources, such as processing time, memory utilization and/or network bandwidth.

FIG. 1 is a block diagram showing one example of a computing system architecture 100. Architecture 100 shows that a plurality of service computing systems 102-104 can be accessed by one or more different client computing systems 106-108, over network 110. Each of the service computing system 102-104 may implement a different service that can be used by the different computing systems 106-108. Thus, each service computing system 102-104 may expose an interface that can be accessed by the client computing systems 106-108 over network 110. Network 110 can thus be any of a wide variety of different types of networks, such as a wide area network, a local area network, a near field communication network, a cellular communication network, or a wide variety of other networks or combinations of networks.

FIG. 1 also shows that, in one example, client computing system 106 can generate user interfaces 111, that have user input mechanisms 112, for interaction by user 114. User 114 thus interacts with user input mechanisms 112 on user interfaces 111 in order to control and manipulate client computing system 106, and some portions of the service computing systems 102-104 that it accesses.

Similarly, client computing system 108 illustratively generates user interfaces 116, with user input mechanisms 118, for interaction by user 120. User 120 illustratively interacts with user interface mechanisms 118 in order to control and manipulate client computing system 108 and parts of the service computing systems 102-104, with which it interacts.

It can happen that a user 114 is dissatisfied with the performance of a service provided by one of the service computing systems 102 or 104 (or both). For instance, assume that user 114 has interacted with user input mechanisms 112 in order to cause client computing system 106 to generate a request of a service implemented by service computing system 102. After receiving a response to that request, it may be that user 114 is dissatisfied with the performance of service computing system 102. Thus, user 114 may provide an input through a user input mechanism 112, indicating that a problem has occurred. For instance, it may be that user 114 actuates an actuator on the user input mechanism 112, indicating that user 114 wishes to report an issue to a support user (such as a support engineer). Also, a problem can be automatically detected and reported as well.

Thus, FIG. 1 shows that a support data storage system 122 exposes an interface 123 so that system 122 is accessible by client computing systems 106-108 and service computing systems 102-104, and a support computing system 124, over network 110. Similarly, support computing system 124 can generate support user interfaces 126 for interaction by a support user 128. Support user 128 may be a support engineer, for example.

Briefly, by way of overview, when a service computing system (such as system 102) generates a response to a request received from a client computing system (such as system 106), the service computing system 102 also generates a correlation identifier and returns that identifier to client computing system 106, along with the response it generated in response to the request that it received from client computing system 106. Then, when user 114 provides an input indicating that a problem has occurred, client computing system 106 provides an indication of this, along with the correlation ID which corresponds to the request for which the problem occurred, to service computing system 102. Service computing system 102 then generates service diagnostic data, corresponding to that correlation ID, and provides the service diagnostic data to support data storage system 122, along with the correlation ID. Client computing system 106 also generates client diagnostic data corresponding to the request and provides the client diagnostic data, along with the correlation ID, to the support data storage system 122. Support data storage system 122 thus stores the client diagnostic data and the service diagnostic data in a data store, and indexes it with the correlation ID. The support user 128 can then use support user interfaces 126 and interfaces 123 to access both the client diagnostic data and the service diagnostic data, in support data storage system 122, using the correlation ID. Thus, support user 128 obtains an aggregated view of all of the diagnostic data for the reported problem, by only accessing a single data storage system 122.

Also, when client computing system 106 submits a request to a service, it may be that multiple different service computing systems 102-104 perform operations in responding to that request. The correlation ID for the request will be shared among all service computing systems 102-104 so that diagnostic data for the corresponding correlation ID can be generated from all of the service computing systems 102-104 and provided to support data storage system 122, where it can all be stored and indexed by the same correlation ID.

In having the service computing systems 102-104 only generate diagnostic data when a problem has occurred, this saves expensive processing overhead which would otherwise be needed to generate the diagnostic data for every client request, regardless of whether it would ever be used (e.g., regardless of whether a problem was ever reported for that request). Similarly, because the diagnostic data is only generated and provided to support data storage system 122 when a problem is reported, this saves bandwidth that would otherwise be consumed in the architecture 100 in sending the diagnostic data back and forth between the service computing system and the client computing system, when the diagnostic data will never be used. In addition, because both the client diagnostic data and the service diagnostic data are stored together and indexed using a single correlation ID in support data storage system 122, this greatly eases the burden of support user 128 in accessing the data. Support user 128 need only access the single support data storage system 122, where the aggregated diagnostic data can be surfaced for support user 128.

Figure 2:
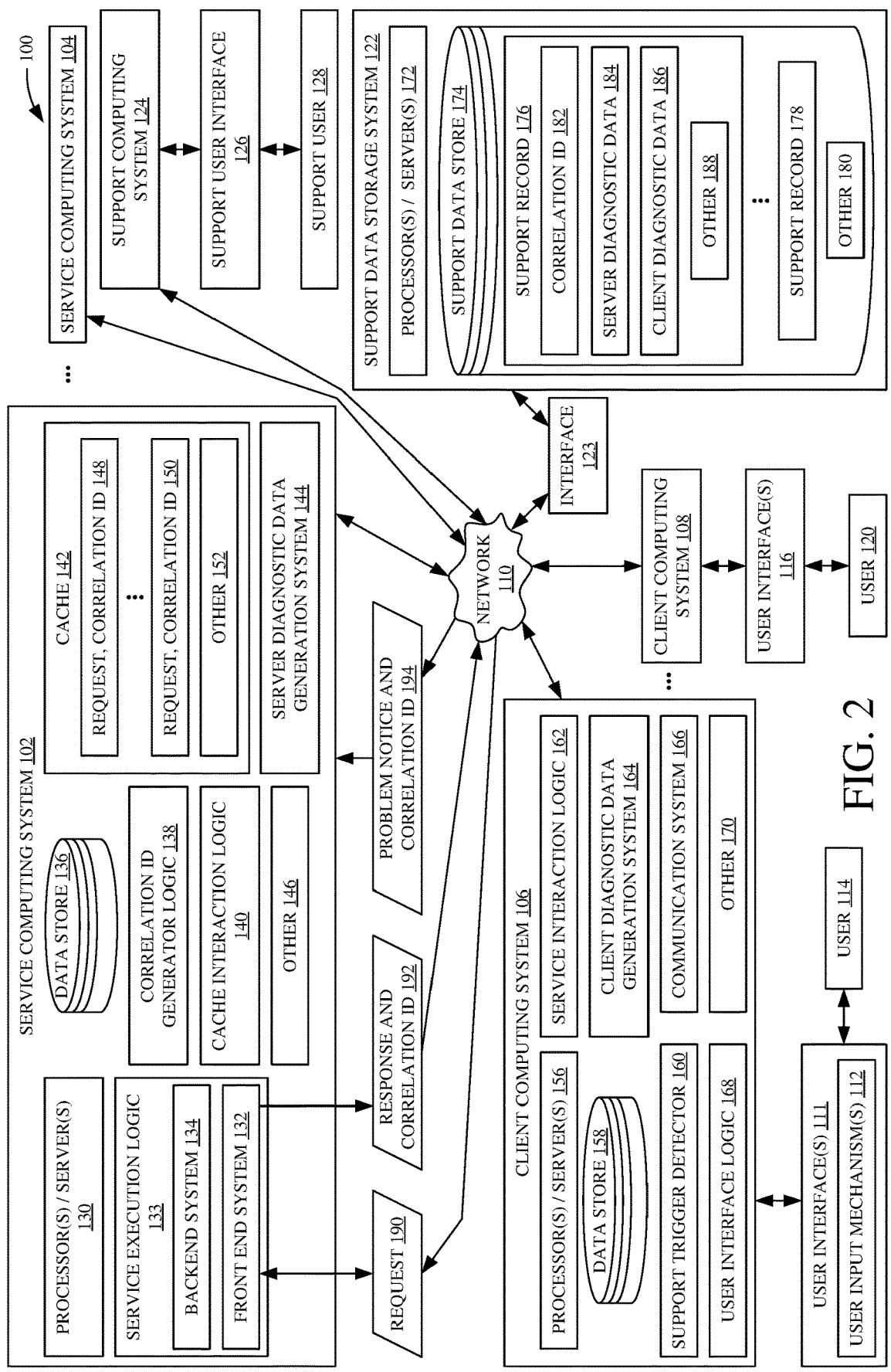
FIG. 2 is a block diagram showing the architecture illustrated in FIG. 1, in more detail.

FIG. 2 shows a block diagram of architecture 100, with some of the items in architecture 100 shown in more detail. Some of the items in FIG. 2 are similar to those shown in FIG. 1, and they are similarly numbered. Before describing the overall operation of architecture 100 in more detail, a brief description of some of the additional items shown in architecture 100, and their operation, will first be provided.

Service computing system 102 illustratively includes one or more processors or servers 130, service execution logic 133 (which can include a frontend system 132 and a backend system 134), data store 136, correlation ID generator logic 138, cache interaction logic 140, cache 142, diagnostic data generation system 144, and it can include a wide variety of other items 146. Cache 142 can include a plurality of records 148-150, and other items 152. Each of the records 148-150 can include a request received from a client computing system, along with a correlation identifier that was generated by correlation ID generator logic 138, for that request.

Client computing system 106 can include one or more processors or servers 156, data store 158, support trigger detector 160, service interaction logic 162, diagnostic data generation system 164, communication system 166, user interface logic 168, and it can include other items 170.

Support data storage system 122 can also include one or more processors or servers 172, to generate interfaces 123 and it can include support data store 174. Support data store 174 can include a plurality of different support records 176-178, and it can include other items 180. Each support record 176 can include a correlation ID 182, server diagnostic data 184, corresponding to the correlation ID 182, client diagnostic data 186 corresponding to the correlation ID 182, and it can include other items 188.

Briefly, by way of overview, frontend system 132 and service computing system 102 can expose an interface that can be called by the service interaction logic 162 in client computing system 106. Logic 162 can thus submit a request 190 to the frontend system 132 over network 110. Frontend system 132 can interact with backend system 134 that, itself, interacts with data (e.g., customer data) in data store 136 to generate a response to request 190. When the request 190 is received, correlation ID generator logic 138 generates a correlation identifier corresponding to the request. It may be a GUID or other unique identifier. Cache interaction logic 140 then stores the request, along with the corresponding correlation ID, as a record 148-150, in cache 142.

When the backend system 134 has generated the response to request 190, it provides it to frontend system 132 which appends the correlation ID to the response and returns the response and correlation ID 192, to the service interaction logic 162 in the client computing system 106 that generated the request.

Service interaction logic 162 then surfaces the response (or the results of the request) for user 114. It may be that user 114, at some point, determines that there is a problem with the service. This may be due to a bug in the service, due to an execution error or other error in the functionality of the service, etc. In that case, user 114 provides an input through a user input mechanism 112 indicating that a problem has occurred. User interface logic 168 generates the user interfaces 111 and detects user interaction with the user interface mechanisms 112. When the user provides an input indicating that a problem has occurred, support trigger detector 160 detects that a problem has occurred and controls service interaction logic 162 to provide an input to service computing system 102 indicating that a problem has occurred, and also indicating the correlation ID corresponding the to the problem. This is indicated by block 194 in FIG. 2. At the same time, diagnostics data generation system 164 generates any client diagnostic data that can be generated on client computing system 106, based upon the reported error. Communication system 166 then communicates the client diagnostic data, along with the correlation ID, to support data storage system 122. Thus, communication system 166 can be configured to communicate over network 110, using interface 123.

When service computing system 102 receives the problem notice and correlation ID 194, cache interaction logic 140 obtains the request corresponding to that correlation ID, from cache 142 and provides it to server diagnostic data generation system 144. Server diagnostic data generation system 144 then generates server diagnostic data that can be generated by service computing system 102, based upon that request. In one example, it resubmits the request to service execution logic 133 and obtains information based upon the operation of service computing system 102 in responding to the request. It can generate diagnostic data in a wide variety of other ways as well. Server diagnostic data generation system 144 then provides the service diagnostic data, along with a correlation ID, to support data storage system 122, through interface 123.

When the client diagnostic data and the service diagnostic data are received at support data storage system 122, processors and/or servers 172 determine that the diagnostic data corresponds to the same correlation ID (and thus corresponds to the same problem that was reported by user 114). It thus stores the diagnostic data, as a support record (e.g., support record 176) in support data store 174. Each support record 176 thus illustratively includes the correlation ID 182, the server diagnostic data 184 corresponding to that correlation ID, and the client diagnostic data 186 corresponding to that correlation ID.

Support computing system 124 may also receive a notification from client computing system 106 indicating that support trigger detector 160 has detected an input to trigger a support operation. The notification will illustratively include the correlation ID so that support user 128 can use support user interface 126 and support computing system 124 to access the support record 176 in support data store 174 (via interface 123), corresponding to the correlation ID. In this way, both the server diagnostic data 184 and the client diagnostic data 186, for the same problem, can easily be accessed by, and surfaced for, support computing system 124 so that the data can be analyzed by support user 128, in addressing the reported problem.

It will be noted that interface 123 may actually include a plurality of different interfaces (e.g., the interface for read operations from support user 128 may be different than the interface for write operation from other computing systems). These and other interface configurations and implementations for the interfaces discussed herein are contemplated.

Figure 3A:
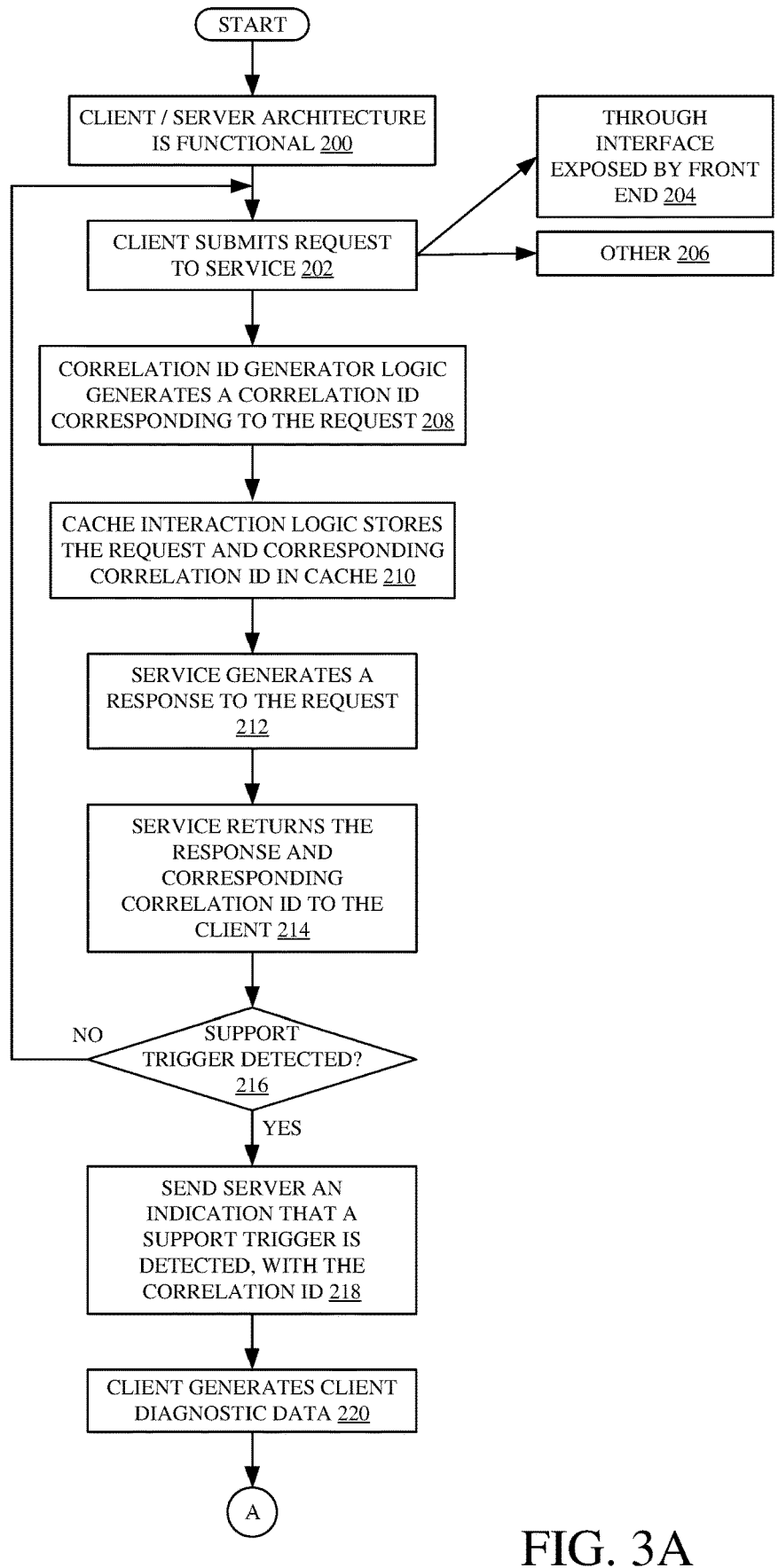
FIGS. 3A and 3B (collectively referred to herein as FIG. 3) show one example of the operation of the architecture illustrated in the previous figures.
Figure 3B:
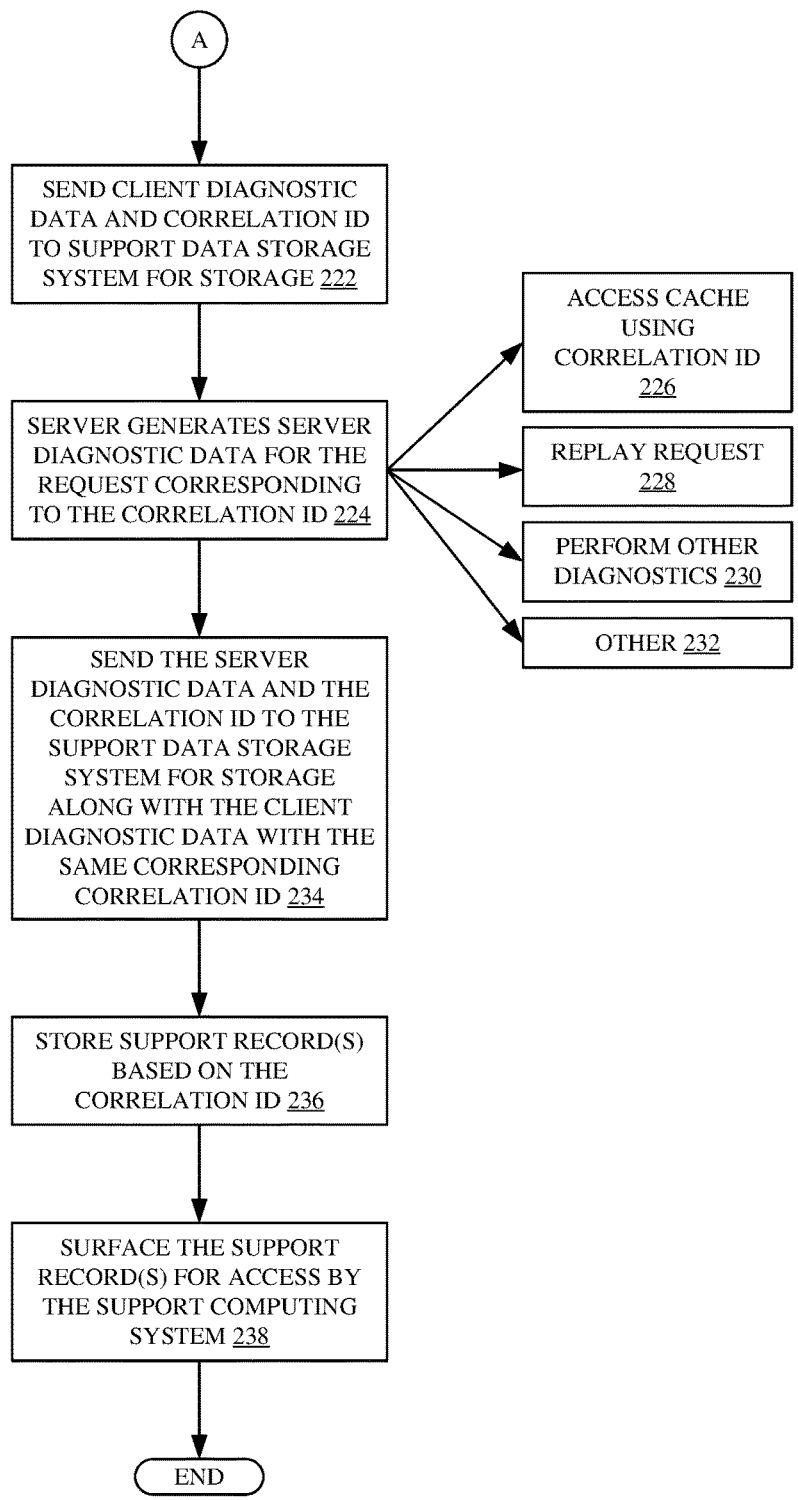

FIGS. 3A and 3B (collectively referred to herein as FIG. 3) show a flow diagram illustrating one example of the operation of architecture 100, in more detail. It is first assumed that the client/server architecture illustrated in FIGS. 1 and 2 is operational so that client computing systems 106-108 can make requests of one or more service computing systems 102-104 and obtain responses to those requests. This is indicated by block 200 in the flow diagram of FIG. 3.

The present discussion will proceed with respect to client computing system 106 submitting a request to service computing system 102. It will be noted, though, that the other client computing systems can also submit requests to the service computing systems, and/or multiple service computing systems can generate responses to a request submitted by a client computing system (e.g., the services can be pipelined or can generate responses simultaneously, etc.).

At some point, client computing system 106 submits a request 190 to service computing system 102. This is indicated by block 202 in the flow diagram of FIG. 3. As discussed above, frontend system 132 can expose an interface that is called by client computing system 106 (e.g., by service interaction logic 162 in client computing system 106) to submit the request. Submitting the request through an exposed interface, that was exposed by frontend system 132, is indicated by block 204. The request can be submitted in other ways as well, and this is indicated by block 206. Frontend system 132 then provides an indication to correlation ID generator logic 138 that a request has been received. Logic 138 generates a correlation ID corresponding to the request. This is indicated by block 208. The correlation ID can be any of a variety of unique identifiers that can be used to identify different requests, and differentiate them from one another. Cache interaction logic 140 then stores the correlation ID, along with the request 190, in cache 142. This is indicated by block 210. Cache 142 can operate in a variety of different ways. It can store records for a predetermined or default, or configurable, amount of time. It can store a given number of records, in a first-in-first-out manner so that the oldest received records are removed from the cache as new records are stored, or it can store records with configurable retention in other ways.

Frontend system 132 also provides request 190 to backend system 134 which generates a response to the request. In doing so, it may access user data in data store 136, or it may perform other operations, based upon the request 190. Generating the response to the request is indicated by block 212 in the flow diagram of FIG. 3.

The frontend system 132 then provides the response and the correlation ID 192 back to the requesting client computing system 106. This is indicated by block 214.

If there is no trouble or other issue with the response, as indicated by block 216, then processing simply reverts to block 202 where other requests can be submitted to the service computing system 102 by client computing system 106.

However, it may be that support trigger detector 160 detects a support trigger at block 216 of FIG. 3. The support trigger can be detected in a variety of different ways. For instance, there may be an automated support trigger generator in client computing system 106 that automatically generates a support trigger. By way of example, if the service computing system 102 is taking too long to respond to request 190, this may generate an automatic trigger to notify support computing system 124 that there may be a problem with service computing system 102. In another example, the support trigger is detected based upon a user input from user 114. For instance, user 114 may observe that the performance of service computing system 102 is somehow compromised (e.g., it is taking too long to respond, it is not responding in an expected or correct fashion, etc.). In that case, user 114 may provide an input through user input mechanisms 112 that cause support trigger detector 160 to detect a support trigger. In one example, user 114 can actuate a link (or other user interface actuator) to send a message or otherwise initiate communication with a support user 128 at support computing system 124. This actuation may be detected by support trigger detector 160 as a support trigger.

If, at block 216 (in the flow diagram of FIG. 3) a support trigger is detected, then service interaction logic 162 sends an indication or notice 194 that a problem has occurred (e.g., that a support trigger is detected), along with the correlation ID for the response 192 that corresponds to the reported problem (or for which the support trigger was generated). Sending the problem notice and correlation ID 194 to service computing system 102 is indicated by block 218 in the flow diagram of FIG. 3.

Also, when support trigger detector 160 detects a support trigger, it indicates this to diagnostic generation system 164 which generates client diagnostic data on client computing system 106. Generating the client diagnostic data is indicated by block 220 in the flow diagram of FIG. 3. There are a wide variety of different types of diagnostic data that can be generated by system 164. It may depend on the type of service to which request 190 was sent. It may include such things as the latency between when the request 190 was sent and the response 192 was received. It may include a wide variety of other diagnostic information as well.

Communication system 166 then sends the client diagnostic data, along with the corresponding correlation ID, to support data storage system 122. This is indicated by block 222 in the flow diagram of FIG. 3.

Similarly, when the problem notice 194 and correlation ID are received at service computing system 102, cache interaction logic 140 accesses cache 142 to obtain the request corresponding to the correlation ID received with the problem notice 194. It provides that request to diagnostic data generation system 144 which generates diagnostic data corresponding to that request. It can do this by resubmitting the request through service execution logic 133 (e.g., to frontend system 132 and/or backend system 134) and recording diagnostic data that is generated during the processing for that request. It can perform a wide variety of other diagnostic data generation operations as well. Generating the server diagnostic data for the request 190 corresponding to the correlation ID is indicated by block 224. Accessing cache 142 using the correlation ID, to obtain the request, is indicated by block 226. Replaying the request through the frontend system 132 and/or backend system 134 is indicated by block 228. Performing other diagnostic operations is indicated by block 230. The server diagnostic data can be generated in many other ways as well, and this is indicated by block 232.

Diagnostic data generation system 144 then sends the server diagnostic data, along with the corresponding correlation ID, to support data storage system 122. This is indicated by block 234 in the flow diagram of FIG. 3. The processor/server 172 in support data storage system 122 then stores the client diagnostic data and server diagnostic data in a support record in support data store 174, using the correlation ID corresponding to that diagnostic data. This is indicated by block 236 in the flow diagram of FIG. 3. In one example, the client and server diagnostic data in the support record are indexed using the correlation ID. The support records can then be surfaced for access by the support computing system 124. This is indicated by block 238.

In this way, when a support user 128 receives an indication that user 114 has reported a problem, that indication will illustratively include the correlation ID. User 128 can then obtain the server diagnostic data and client diagnostic data, for that correlation ID, from the appropriate support record in support data store 174 using interface 123. This information can be surfaced by support computing system 124 on a support user interface 126 for support user 128. In this way, support user 128 can obtain an aggregated set of diagnostic data (the diagnostic data generated on the client computing system 106 and that generated on the service computing system 102) by accessing a single data store. Similarly, because the diagnostic data is only generated on service computing system 102 and provided to support data storage system 122 when a problem is reported or automatically detected, this saves expensive processing overhead that would otherwise be used to generate the diagnostic data. It also conserves bandwidth which would be consumed in transmitting unneeded diagnostic data.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
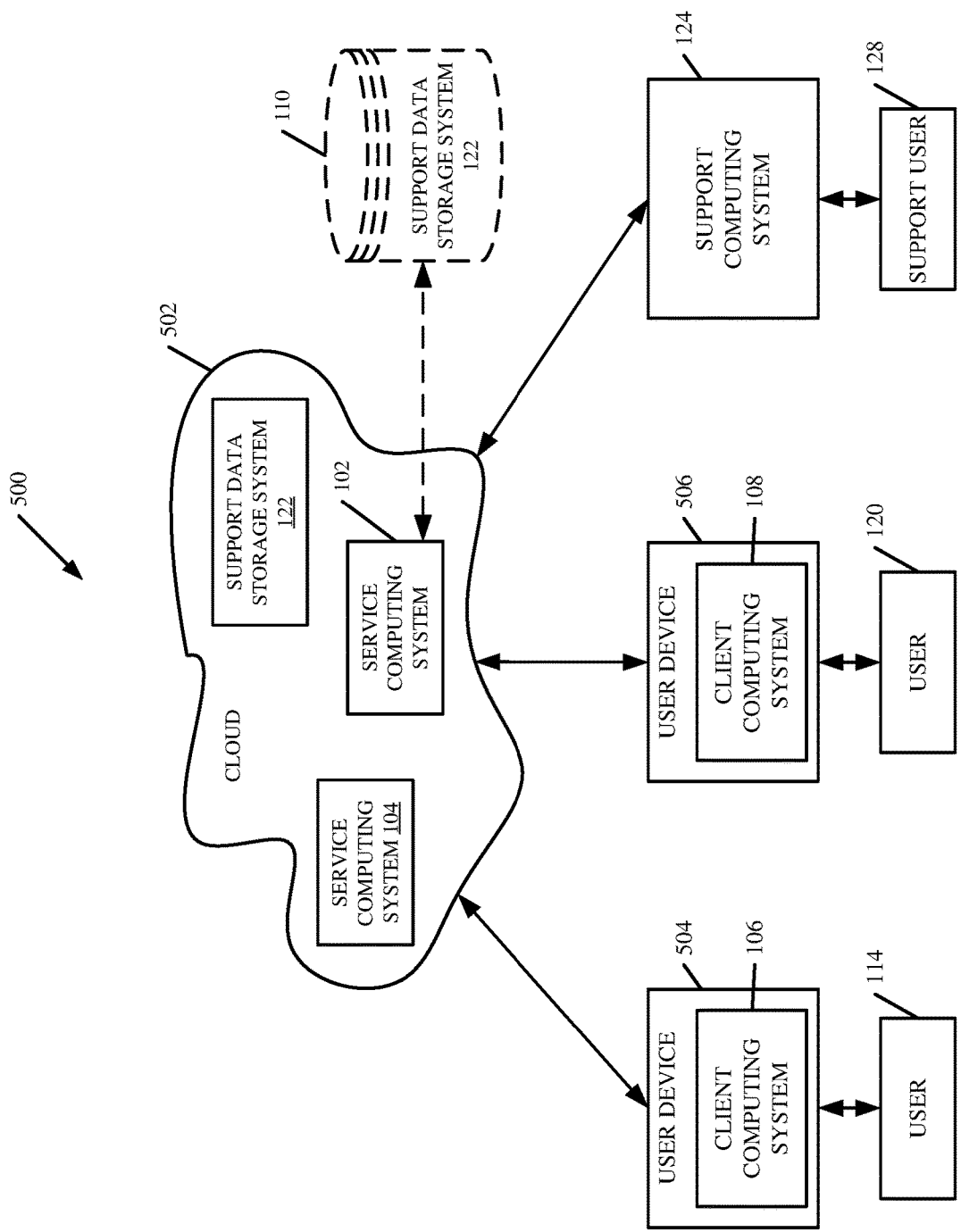
FIG. 4 is a block diagram showing one example of the architecture illustrated in the previous figures, deployed in a cloud computing architecture.

FIG. 4 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 4, some items are similar to those shown in FIG. 1 and they are similarly numbered. FIG. 4 specifically shows that service computing systems 102 and 104 can be located in cloud 502 (which can be public, private, or a combination where portions are public while others are private). Therefore, users 114 and 120 use user devices 504 and 506 to access those systems through cloud 502. FIG. 4 also shows that support data storage system 122 can also be located in cloud 502. Support user 128 uses support computing system 124 to access support data storage system 122.

FIG. 4 also depicts another example of a cloud architecture. FIG. 4 shows that it is also contemplated that some elements of architecture 100 can be disposed in cloud 502 while others are not. By way of example, support data storage system 122 can be disposed outside of cloud 502, and accessed through cloud 502. Regardless of where they are located, they can be accessed directly by devices 504 and 506 and system 124, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
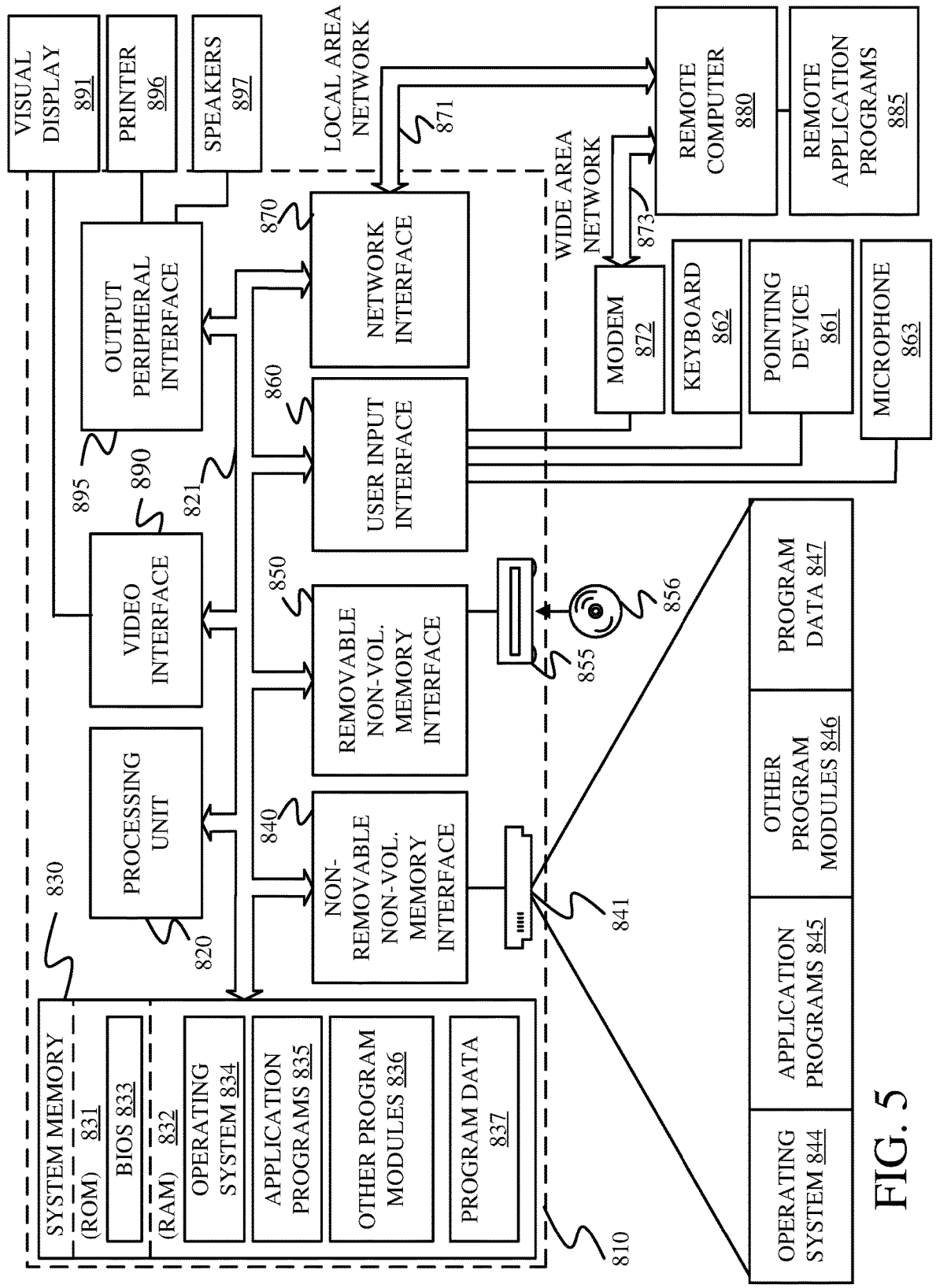
FIG. 5 is a block diagram showing one example of a computing environment that can be used in the architectures shown in the previous figures.

FIG. 5 is one example of a computing environment in which architecture 100, or parts of it, (for example) can be deployed. With reference to FIG. 5, an example system for implementing some embodiments includes a computing device in the form of a computer 810 that is configured to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 5.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 5 illustrates operating system 834, application programs 835, other program modules 836, and program data 837.

The computer 810 may also include other removable/non-removable volatile/nonvolatile computer storage media. By way of example only, FIG. 5 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 5, provide storage of computer readable instructions, data structures, program modules and other data for the computer 810. In FIG. 5, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 5 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 5 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Example 1 is a computing system, comprising:
at least one processor;
service execution logic, executed by the at least one processor, that receives a client request generated by a client computing system and generates a response to the client request;
correlation identifier (ID) generator logic, executed by the at least one processor, that generates a correlation ID corresponding to the client request, the service execution logic sending the response and the correlation ID to the client computing system;
cache interaction logic, executed by the at least one processor, that generates a memory record that includes the client request and the corresponding correlation ID for storage in a memory; and
a server diagnostic data generation system that receives the correlation ID and a problem indication indicating that a problem is detected, with respect to the response, at the client computing system, the server diagnostic data generation system generating server diagnostic data based on the request stored in the memory with the corresponding correlation ID and sending the server diagnostic data to a support data storage system, along with the corresponding correlation ID.

Example 2 is the computing system of any or all previous examples wherein the service execution logic comprises:
a front end system that exposes an interface that receives the client request.

Example 3 is the computing system of any or all previous examples wherein the service execution logic comprises:
a back end system that receives an indication of the client request from the front end system and performs a service operation, based on the client request, to generate the response.

Example 4 is the computing system of any or all previous examples wherein the server diagnostic data generation system is configured to, receive the problem indication and the correlation ID, to use the cache interaction logic to access the memory.

Example 5 is the computing system of any or all previous examples wherein the server diagnostic data generation system is configured to use the interaction logic to access the memory and obtain an indication of the client request from the cache memory based on the correlation ID and generate the server diagnostic data based on the indication of the client request.

Example 6 is the computing system of any or all previous examples wherein the server diagnostic data generation system is configured to generate the server diagnostic data by re-submitting the client request obtained from the memory, to the service execution logic.

Example 7 is the computing system of any or all previous examples wherein the memory comprises a cache memory that is configurable to vary retention of the client request.

Example 8 is a computer implemented method, comprising:
receiving, with at least one processor, a client request generated by a client computing system;
generating, with service execution logic implemented by the at least one processor, a response to the client request;
generating, with correlation identifier (ID) generator logic, a correlation ID corresponding to the client request;
sending the response and the correlation ID to the client computing system;
generating, with the at least one processor, a memory record that includes the client request and the corresponding correlation ID for storage in a memory;
receiving, at a server diagnostic data generation system, the correlation ID and a problem indication indicating that a problem is detected, with respect to the response, at the client computing system;
generating, with the server diagnostic data generation system, server diagnostic data based on the request stored in the memory with the corresponding correlation ID; and
sending the server diagnostic data to a support data storage system, along with the corresponding correlation ID.

Example 9 is the computer implemented method of any or all previous examples wherein receiving a client request comprises:
exposing an interface, with a front end system, that receives the client request from the client computing system.

Example 10 is the computer implemented method of any or all previous examples wherein generating the response comprises:
receiving, at a back end system, an indication of the client request from the front end system; and
performing a service operation with the back end system, based on the client request, to generate the response.

Example 11 is the computer implemented method of any or all previous examples wherein generating server diagnostic data comprises:
accessing the memory record based on the problem indication and the correlation ID to obtain the client request, from the memory, corresponding to the correlation identifier.

Example 12 is the computer implemented method of any or all previous examples wherein generating the server diagnostic data comprises:
receiving an indication of the client request from the memory; and
generating the server diagnostic data based on the indication of the client request.

Example 13 is the computer implemented method of any or all previous examples generating the server diagnostic data comprises:
re-submitting the client request obtained from the memory, to the service execution logic.

Example 14 is the computer implemented method of any or all previous examples wherein generating a memory record comprises:
generating the memory record for storage in a cache memory that is configurable to vary retention of the memory record.

Example 15 is a computer implemented method, comprising:
receiving server diagnostic data generated by a first service computing system based on a client request received from a client computing system, the client request having a corresponding correlation identifier;
receiving client diagnostic data and the correlation identifier from a client computing system, the client diagnostic data being generated by the client computing system based on the client request and a response from the first service computing system;
storing the server diagnostic data from the first service computing system and the client diagnostic data in a data store, indexed by the correlation identifier; and
exposing an interface that receives an access request from a support computing system and providing access to the stored server diagnostic data and the client diagnostic data to the support computing system based on the correlation identifier and the access request.

Example 16 is the computer implemented method of any or all previous examples and further comprising:

receiving server diagnostic data generated by a second service computing system, and the correlation identifier, based on the client request received, at the first service computing system, from the client computing system; and storing the server diagnostic data from the second service computing system in the data store, indexed by the correlation identifier.

Example 17 is the computer implemented method of any or all previous examples wherein exposing an interface comprises:

exposing the interface that receives the access request from the support computing system and providing access to the stored server diagnostic data from the first service computing system, the server diagnostic data from the second computing system and the client diagnostic data to the support computing system based on the correlation identifier and the access request.

Example 18 is a computer implemented method, comprising:

sending a service request to a service computing system;

receiving a response to the service request, from the service computing system, along with a correlation identifier corresponding to the service request;

detecting a support trigger;

sending a support notification to the server computing system along with the correlation identifier based on the detected support trigger;

generating client diagnostic data based on the service request and the response;

and sending the client diagnostic data and the correlation identifier to a support data storage system.

Example 19 is the computer implemented method of any or all previous examples wherein detecting a support trigger comprises:

detecting user actuation of a support request actuator on a user interface.

Example 20 is the computer implemented method of any or all previous examples wherein detecting a support trigger comprises:

detecting an automatically generated support trigger.

What is claimed is:

1. A computer implemented method comprising:
receiving first request server diagnostic data generated by a service computing system based on a first client request received from a client computing system, the first client request having a first correlation identifier;
receiving, from the client computing system, first request client diagnostic data and the first correlation identifier, the first request client diagnostic data corresponding to the first client request and based on a first response to the first client request from the service computing system;
generating a first support record that stores the first request server diagnostic data from the service computing system, the first request client diagnostic data, and the first correlation identifier;
receiving second request server diagnostic data generated by the service computing system based on a second client request received from the client computing system, the second client request having a second correlation identifier;
receiving, from the client computing system, second request client diagnostic data and the second correlation identifier, the second request client diagnostic data corresponding to the second client request and based on a second response to the second client request from the service computing system;
generating a second support record that stores the second request server diagnostic data from the service computing system, the second request client diagnostic data, and the second correlation identifier;
exposing an interface that receives an access request from a support computing system, the access request including a requested correlation identifier; and
providing access to at least one of the first support record or the second support record to the support computing system based on the requested correlation identifier in the access request.

2. The computer implemented method of claim 1, wherein the service computing system comprises a first service computing system, and the method further comprises:
receiving additional first request server diagnostic data generated by a second service computing system;
storing the additional first request server diagnostic data from the second service computing system in the first support record; and
indexing the first request server diagnostic data and the additional first request server diagnostic data based on the correlation identifier.

3. The computer implemented method of claim 2, wherein providing access comprises:
providing access to the first request server diagnostic data and the additional first request server diagnostic data based on the index.

4. The computer implemented method of claim 2, wherein the additional first request server diagnostic data is generated by the second service computing system based on the first client request received from the client computing system, and exposing an interface comprises:
providing access to the first request server diagnostic data from the first service computing system, the additional first request server diagnostic data from the second computing system and the first request client diagnostic data to the support computing system based on the requested correlation identifier and the access request.

5. The computer implemented method of claim 1, wherein the first correlation identifier is generated by the service computing system and provided to the client computing system with the first response from the service computing system.

6. A computing system comprising:
at least one processor; and
memory storing instructions executable by the at least one processor, wherein the instructions, when executed, cause the computing system to:
receive first request server diagnostic data generated by a service computing system based on a first client request received from a client computing system, the first client request having a first correlation identifier;
receive, from the client computing system, first request client diagnostic data and the first correlation identifier from the client computing system, the first request client diagnostic data being generated by the client computing system based on the first client request and based on a first response to the first client request from the service computing system;
generate a first support record that stores the first request server diagnostic data from the service computing system, the first request client diagnostic data, and the first correlation identifier;

receive second request server diagnostic data generated by the service computing system based on a second client request received from the client computing system, the second client request having a second correlation identifier;

receive, from the client computing system, second request client diagnostic data and the second correlation identifier, the second request client diagnostic data corresponding to the second client request and based on a second response to the second client request from the service computing system;

generate a second support record that stores the second request server diagnostic data from the service computing system, the second request client diagnostic data, and the second correlation identifier;

expose an interface that receives an access request from a support computing system, the access request including a requested correlation identifier; and access at least one of the first support record or the second support record based on the requested correlation identifier in the access request, and provide data in the at least one of the first support record or the second support record to the support computing system.

7. The computing system of claim 6, wherein the service computing system comprises a first service computing system, and the instructions cause the computing system to:

receive additional first request server diagnostic data generated by a second service computing system; and store the additional first request server diagnostic data from the second service computing system in the first support record; and index the first request server diagnostic data and the additional first request server diagnostic data based on the first correlation identifier.

8. The computing system of claim 7, wherein the instructions cause the computing system to provide access to the first request server diagnostic data and the additional first request server diagnostic data based on the index.

9. The computing system of claim 7, wherein the additional first request server diagnostic data is generated by the second service computing system based on the first client request received from the client computing system, and the instructions cause the computing system to:

provide access to the first request server diagnostic data from the first service computing system, the additional first request server diagnostic data from the second computing system and the first request client diagnostic data to the support computing system based on the first correlation identifier and the access request.

10. The computing system of claim 6, wherein the first correlation identifier is generated by the service computing system and provided to the client computing system with the response from the service computing system.

11. A method performed by a client computing system, the method comprising:

sending a particular service request from the client computing system to a service computing system;

receiving, from the service computing system, a response to the service request along with a correlation identifier corresponding to the particular service request, wherein the correlation identifier uniquely identifies the particular service request from one or more other service requests sent from the client computing system;

detecting a support trigger;

sending a support notification to the service computing system along with the correlation identifier based on the detected support trigger;

generating client diagnostic data based on the service request and the response; and sending the client diagnostic data and the correlation identifier to a support data storage system.

12. The method of claim 11, wherein detecting a support trigger comprises:

detecting user actuation of a support request actuator on a user interface.

13. The method of claim 11, wherein detecting a support trigger comprises:

detecting an automatically generated support trigger.

14. The method of claim 13, wherein detecting the automatically generated support trigger comprises detecting performance of the service computing system.

15. The method of claim 11, wherein the client diagnostic data indicates a latency between when the service request was sent to the service computing system and when the response was received.

* * * * *